(12) United States Patent
Toosi et al.

(10) Patent No.: US 8,974,047 B2
(45) Date of Patent: Mar. 10, 2015

(54) PHASE CHANGE INK CONTAINING ETHYLENE VINYL ACETATE

(71) Applicant: Xerox Corporation, Norwalk, CT (US)

(72) Inventors: Salma Falah Toosi, Mississauga (CA); Mihaela Maria Birau, Mississauga (CA); Biby Esther Abraham, Mississauga (CA); Stephan V. Drappel, Toronto (CA); James D. Mayo, Mississauga (CA); Peter G. Odell, Mississauga (CA); Jeffrey H. Banning, Hillsboro, OR (US); Caroline Turek, Mississauga (CA)

(73) Assignee: Xerox Corporation, Norwalk, CT (US)

( * ) Notice: Subject to any disclaimer, the term of this patent is extended or adjusted under 35 U.S.C. 154(b) by 147 days.

(21) Appl. No.: 13/685,768

(22) Filed: Nov. 27, 2012

(65) Prior Publication Data

US 2014/0146114 A1    May 29, 2014

(51) Int. Cl.

| | |
|---|---|
| *C09D 11/00* | (2014.01) |
| *C09D 11/34* | (2014.01) |
| *C09D 11/36* | (2014.01) |
| *B41J 2/21* | (2006.01) |
| *B41J 2/175* | (2006.01) |

(52) U.S. Cl.
CPC ............... *C09D 11/34* (2013.01); *C09D 11/36* (2013.01); *B41J 2/2107* (2013.01); *B41J 2/17593* (2013.01)
USPC ............ 347/99; 347/88; 347/100; 106/31.29; 106/31.61

(58) Field of Classification Search
CPC ........ B41J 2/01; B41J 2/2107; B41J 2/17593; C09D 11/00; C09D 11/02; C09D 11/34; C09D 11/36; C09D 11/38; C09D 11/40
USPC .............. 347/88, 95–100, 102; 523/160, 161; 106/31.29–31.31, 31.61–31.63
See application file for complete search history.

(56) References Cited

U.S. PATENT DOCUMENTS

| | | |
|---|---|---|
| 3,653,932 A | 4/1972 | Berry et al. |
| 4,251,824 A | 2/1981 | Hara et al. |
| 4,390,369 A | 6/1983 | Merritt et al. |
| 4,410,899 A | 10/1983 | Haruta et al. |
| 4,412,224 A | 10/1983 | Sugitani |
| 4,484,948 A | 11/1984 | Merritt et al. |
| 4,490,731 A | 12/1984 | Vaught |
| 4,532,530 A | 7/1985 | Hawkins |

(Continued)

FOREIGN PATENT DOCUMENTS

| | | |
|---|---|---|
| EP | 0187352 | 7/1986 |
| EP | 206286 | 12/1986 |

(Continued)

OTHER PUBLICATIONS

English abstract for German Patent Publication DE 4205636AL, Aug. 26, 1993.

(Continued)

*Primary Examiner* — Matthew Luu
*Assistant Examiner* — Rut Patel
(74) *Attorney, Agent, or Firm* — Marylou J. Lavoie

(57) ABSTRACT

A phase change ink composition including an ink vehicle; an optional colorant; and ethylene vinyl acetate in an amount of from about 0.1 to about 10 percent by weight based on the total weight of the phase change ink composition.

19 Claims, 4 Drawing Sheets

(56) References Cited

U.S. PATENT DOCUMENTS

| | | |
|---|---|---|
| 4,601,777 A | 7/1986 | Hawkins et al. |
| 4,684,956 A | 8/1987 | Ball |
| 4,830,671 A | 5/1989 | Frihart et al. |
| 4,851,045 A | 7/1989 | Taniguchi |
| 4,889,560 A | 12/1989 | Jaeger et al. |
| 4,889,761 A | 12/1989 | Titterington et al. |
| 5,006,170 A | 4/1991 | Schwarz et al. |
| 5,151,120 A | 9/1992 | You et al. |
| 5,194,638 A | 3/1993 | Frihart et al. |
| 5,195,430 A | 3/1993 | Rise |
| 5,221,335 A | 6/1993 | Williams et al. |
| 5,372,852 A | 12/1994 | Titterington et al. |
| 5,389,958 A | 2/1995 | Bui et al. |
| 5,496,879 A | 3/1996 | Griebel et al. |
| 5,597,856 A | 1/1997 | Yu et al. |
| 5,750,604 A | 5/1998 | Banning et al. |
| 5,780,528 A | 7/1998 | Titterington et al. |
| 5,782,966 A | 7/1998 | Bui et al. |
| 5,783,658 A | 7/1998 | Banning et al. |
| 5,827,918 A | 10/1998 | Kassal |
| 5,830,942 A | 11/1998 | King et al. |
| 5,919,839 A | 7/1999 | Titterington et al. |
| 6,174,937 B1 | 1/2001 | Banning et al. |
| 6,255,432 B1 | 7/2001 | Evans et al. |
| 6,309,453 B1 | 10/2001 | Banning et al. |
| 6,476,219 B1 | 11/2002 | Duff et al. |
| 6,547,380 B2 | 4/2003 | Smith et al. |
| 6,860,930 B2 | 3/2005 | Wu et al. |
| 6,906,118 B2 | 6/2005 | Goodbrand et al. |
| 7,019,060 B1 | 3/2006 | Morrison et al. |
| 7,973,186 B1 | 7/2011 | Goredema et al. |
| 2003/0019394 A1* | 1/2003 | Itoh .............................. 106/31.29 |
| 2009/0082489 A1* | 3/2009 | Breton et al. .................. 523/200 |
| 2009/0305060 A1* | 12/2009 | Roth et al. ..................... 428/442 |

FOREIGN PATENT DOCUMENTS

| | | |
|---|---|---|
| GB | 2238792 | 6/1991 |
| GB | 2290793 | 1/1996 |
| GB | 2294939 | 5/1996 |
| GB | 2305670 | 4/1997 |
| GB | 2305928 | 4/1997 |
| WO | WO 94/04619 | 3/1994 |
| WO | WO 94/14902 | 7/1994 |
| WO | WO 95/04760 | 2/1995 |
| WO | WO 96/14364 | 5/1995 |
| WO | WO 97/12003 | 4/1997 |
| WO | WO 97/13816 | 4/1997 |
| WO | WO 9733943 | 9/1997 |

OTHER PUBLICATIONS

English abstract for German Patent Publication DE 4205713AL, Mar. 5, 1996.

* cited by examiner

PHASE CHANGE INK CONTAINING ETHYLENE VINYL ACETATE

TECHNICAL FIELD

Described herein are phase change ink compositions containing ethylene vinyl acetate having improved scratch and fold characteristics.

BACKGROUND

Disclosed herein is a phase change ink composition comprising a carrier; an optional colorant; and ethylene vinyl acetate in an amount of from about 0.5 to about 5 percent by weight based on the total weight of the phase change ink composition.

In general, phase change inks (sometimes referred to as "hot melt inks") are in the solid phase at ambient temperature, but exist in the liquid phase at the elevated operating temperature of an ink jet printing device. At the jet operating temperature, droplets of liquid ink are ejected from the printing device and, when the ink droplets contact the surface of the recording substrate, either directly or via an intermediate heated transfer belt or drum, they quickly solidify to form a predetermined pattern of solidified ink drops. Phase change inks have also been used in other printing technologies, such as gravure printing.

Phase change inks for color printing typically comprise a phase change ink carrier composition which is combined with a phase change ink compatible colorant. In a specific embodiment, a series of colored phase change inks can be formed by combining ink carrier compositions with compatible subtractive primary colorants. The subtractive primary colored phase change inks can comprise four component dyes, namely, cyan, magenta, yellow and black, although the inks are not limited to these four colors. These subtractive primary colored inks can be formed by using a single dye or a mixture of dyes. For example, magenta can be obtained by using a mixture of Solvent Red Dyes or a composite black can be obtained by mixing several dyes. U.S. Pat. Nos. 4,889,560, 4,889,761, and 5,372,852, the disclosures of each of which are totally incorporated herein by reference, teach that the subtractive primary colorants employed can comprise dyes from the classes of Color Index (C.I.) Solvent Dyes, Disperse Dyes, modified Acid and Direct Dyes, and Basic Dyes.

The colorants can also include pigments, as disclosed in, for example, U.S. Pat. No. 5,221,335, the disclosure of which is totally incorporated herein by reference.

Phase change inks have also been used for applications such as postal marking, industrial marking, and labeling.

Phase change inks are desirable for ink jet printers because they remain in a solid phase at room temperature during shipping, long term storage, and the like. In addition, the problems associated with nozzle clogging as a result of ink evaporation with liquid ink jet inks are largely eliminated, thereby improving the reliability of the ink jet printing. Further, in phase change ink jet printers wherein the ink droplets are applied directly onto the final recording substrate (for example, paper, transparency material, and the like), the droplets solidify immediately upon contact with the substrate, so that migration of ink along the printing medium is prevented and dot quality is improved.

Compositions suitable for use as phase change ink carrier compositions are known. Some representative examples of references disclosing such materials include U.S. Pat. Nos. 3,653,932, 4,390,369, 4,484,948, 4,684,956, 4,851,045, 4,889,560, 5,006,170, 5,151,120, 5,372,852, 5,496,879, European Patent Publication 0187352, European Patent Publication 0206286, German Patent Publication DE 4205636AL, German Patent Publication DE 4205713AL, and PCT Patent Application WO 94/04619, the disclosures of each of which are totally incorporated herein by reference. Suitable carrier materials can include paraffins, microcrystalline waxes, polyethylene waxes, ester waxes, fatty acids and other waxy materials, fatty amide containing materials, sulfonamide materials, resinous materials made from different natural sources (tall oil rosins and rosin esters, for example), and many synthetic resins, oligomers, polymers, and copolymers.

Ink jetting devices are known in the art, and thus extensive description of such devices is not required herein. As described in U.S. Pat. No. 6,547,380, incorporated herein by reference, ink jet printing systems generally are of two types: continuous stream and drop-on-demand. In continuous stream ink jet systems, ink is emitted in a continuous stream under pressure through at least one orifice or nozzle. The stream is perturbed, causing it to break up into droplets at a fixed distance from the orifice. At the break-up point, the droplets are charged in accordance with digital data signals and passed through an electrostatic field that adjusts the trajectory of each droplet in order to direct it to a gutter for recirculation or a specific location on a recording medium. In drop-on-demand systems, a droplet is expelled from an orifice directly to a position on a recording medium in accordance with digital data signals. A droplet is not formed or expelled unless it is to be placed on the recording medium.

There are at least three types of drop-on-demand ink jet systems. One type of drop-on-demand system is a piezoelectric device that has as its major components an ink filled channel or passageway having a nozzle on one end and a piezoelectric transducer near the other end to produce pressure pulses. Another type of drop-on-demand system is known as acoustic ink printing. As is known, an acoustic beam exerts a radiation pressure against objects upon which it impinges. Thus, when an acoustic beam impinges on a free surface (i.e., liquid/air interface) of a pool of liquid from beneath, the radiation pressure which it exerts against the surface of the pool may reach a sufficiently high level to release individual droplets of liquid from the pool, despite the restraining force of surface tension. Focusing the beam on or near the surface of the pool intensifies the radiation pressure it exerts for a given amount of input power. Still another type of drop-on-demand system is known as thermal ink jet, or bubble jet, and produces high velocity droplets. The major components of this type of drop-on-demand system are an ink filled channel having a nozzle on one end and a heat generating resistor near the nozzle. Printing signals representing digital information originate an electric current pulse in a resistive layer within each ink passageway near the orifice or nozzle, causing the ink vehicle (usually water) in the immediate vicinity to vaporize almost instantaneously and create a bubble. The ink at the orifice is forced out as a propelled droplet as the bubble expands.

In a typical design of a piezoelectric ink jet device utilizing phase change inks printing directly on a substrate or on an intermediate transfer member, such as the one described in U.S. Pat. No. 5,372,852, incorporated herein by reference, the image is applied by jetting appropriately colored inks during four to eighteen rotations (incremental movements) of a substrate (an image receiving member or intermediate transfer member) with respect to the ink jetting head, i.e., there is a small translation of the printhead with respect to the substrate in between each rotation. This approach simplifies the printhead design, and the small movements ensure good droplet registration. At the jet operating temperature, droplets of liquid ink are ejected from the printing device and, when the ink droplets contact the surface of the recording substrate, either directly or via an intermediate heated transfer belt or drum, they quickly solidify to form a predetermined pattern of solidified ink drops.

Thermal ink jet processes are well known and are described, for example, in U.S. Pat. Nos. 4,601,777, 4,251,824, 4,410,899, 4,412,224 and 4,532,530, the disclosures of each of which are hereby incorporated herein.

Ink jet printing processes may employ inks that are solid at room temperature and liquid at elevated temperatures. Such inks may be referred to as hot melt inks or phase change inks. For example, U.S. Pat. No. 4,490,731, which is hereby incorporated by reference herein, discloses an apparatus for dispensing solid ink for printing on a substrate such as paper. In thermal ink jet printing processes employing hot melt inks, the solid ink is melted by the heater in the printing apparatus and utilized (i.e., jetted) as a liquid in a manner similar to that of conventional thermal ink jet printing. Upon contact with the printing substrate, the molten ink solidifies rapidly, enabling the colorant to substantially remain on the surface of the substrate instead of being carried into the substrate (for example, paper) by capillary action, thereby enabling higher print density than is generally obtained with liquid inks. Advantages of a phase change ink in ink jet printing are thus elimination of potential spillage of the ink during handling, a wide range of print density and quality, minimal paper cockle or distortion, and enablement of indefinite periods of non-printing without the danger of nozzle clogging, even without capping the nozzles.

Examples of the phase change inks herein are inks that include an ink vehicle that is solid at temperatures of about 23° C. to about 27° C., for example room temperature, and specifically are solid at temperatures below about 60° C. However, the inks change phase upon heating, and are in a molten state at jetting temperatures. Thus, the inks have a viscosity of from about 1 to about 20 centipoise (cp), for example from about 5 to about 15 cp or from about 8 to about 12 cp, at an elevated temperature suitable for ink jet printing, for example temperatures of from about 60° C. to about 150° C.

In this regard, the inks herein may be either low energy inks or high energy inks. Low energy inks are solid at a temperature below about 40° C. and have a viscosity of from about 1 to about 20 centipoise such as from about 5 to about 16 centipoise, for example from about 8 to about 12 cp, at a jetting temperature of from about 60° C. to about 120° C. such as about 80° C. to about 115° C., for example from about 90° C. to about 115° C. High energy inks are solid at a temperature below 40° C. and have a viscosity of from about 5 to about 16 centipoise at a jetting temperature of from about 120° C. to about 180° C., for example from 120° C. to about 160° C. or from about 125° C. to about 150° C.

Current solid ink formulations can employ a high content of polyethylene wax. Dye-based and pigmented solid inks based on polyethylene wax carrier compositions can be relatively brittle and therefore can suffer from lack of scratch and fold resistance.

Currently available phase change ink compositions are suitable for their intended purposes. However a need remains for improved phase change inks. Further, a need remains for an improved pigmented and dye-based phase change ink compositions. Further, a need remains for a phase change ink having improved performance with respect to scratch and fold resistance while preserving the desired characteristics of phase change ink, particularly while preserving the desired characteristics of pigmented solid inks, including Newtonian rheology, good filtration properties, thermal stability, and ink jetting robustness.

The appropriate components and process aspects of the each of the foregoing U.S. Patents and Patent Publications may be selected for the present disclosure in embodiments thereof. Further, throughout this application, various publications, patents, and published patent applications are referred to by an identifying citation. The disclosures of the publications, patents, and published patent applications referenced in this application are hereby incorporated by reference into the present disclosure to more fully describe the state of the art to which this invention pertains.

SUMMARY

Described is a phase change ink composition comprising an ink vehicle; an optional colorant; and ethylene vinyl acetate in an amount of from about 0.1 to about 10 percent by weight based on the total weight of the phase change ink composition.

Also described is a method for preparing a phase change ink composition comprising combining an ink vehicle; an optional colorant; and ethylene vinyl acetate in an amount of from about 0.1 to about 10 percent by weight based on the total weight of the phase change ink composition to produce a phase change ink composition.

Also described is a method comprising incorporating into an ink jet printing apparatus a phase change ink composition comprising an ink vehicle; an optional colorant; and ethylene vinyl acetate in an amount of from about 0.1 to about 10 percent by weight based on the total weight of the phase change ink composition; melting the ink composition; and causing droplets of the melted ink to be ejected in an imagewise pattern onto a substrate.

Also described is an ink jet printer stick or pellet containing a phase change ink composition comprising an ink vehicle; an optional colorant; and ethylene vinyl acetate in an amount of from about 0.1 to about 10 percent by weight based on the total weight of the phase change ink composition.

DETAILED DESCRIPTION

Figure 1:
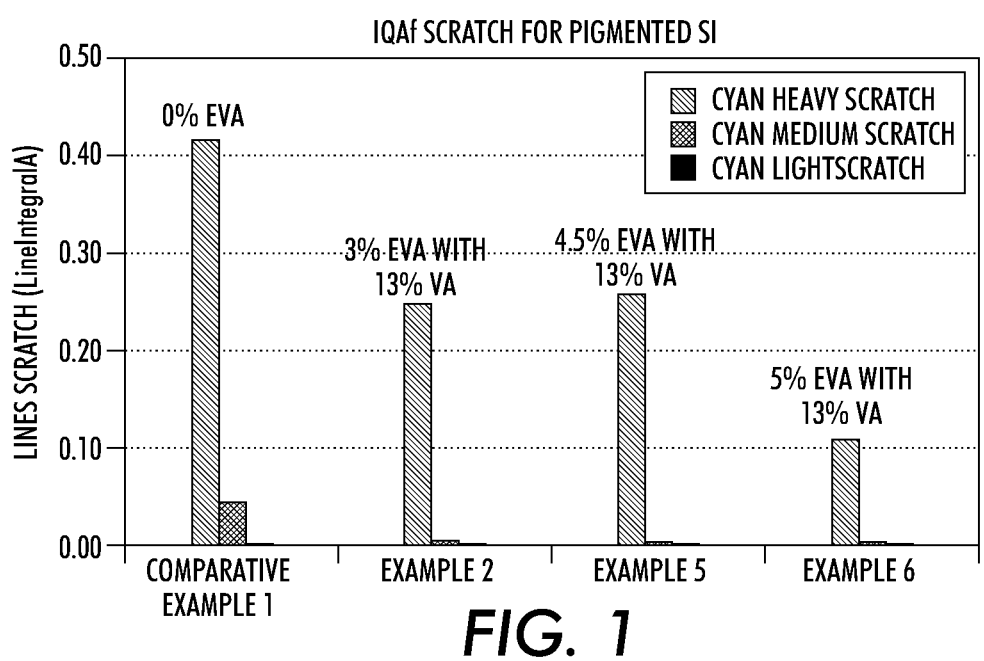
FIG. 1 is a bar graph showing IQAF scratch for a comparative pigmented cyan phase change ink and for pigmented cyan phase change ink in accordance with the present disclosure.

In embodiments, ethylene vinyl acetate copolymers are employed in both dye-based and pigmented solid inks in order to increase scratch and fold robustness of the resulting prints.

Currently available phase change ink compositions are suitable for their intended purposes. However a need remains for improved phase change inks. In particular, the problem of lack of image robustness can still exist for certain inks. The present inventors have found that the image robustness of solid ink can be substantially improved by incorporating a small amount of ethylene vinyl acetate. "Image robustness" herein is meant to include scratch and fold resistance. In embodiments, the addition of from about 0.1 to about 10, or 0.5 to about 5, or from about 3 to about 5 percent by weight ethylene vinyl acetate to pigmented solid ink based on the total weight of the pigmented solid ink composition significantly improves the performance of the ink with respect to scratch and fold resistance. For example, pigmented cyan ink print scratches almost 4 times less by incorporation into the pigmented ink formulation about 5 percent by weight ethylene vinyl acetate based on the total weight of the pigmented ink formulation with the ethylene vinyl acetate containing about 13 percent vinyl acetate by weight based on the total weight of the ethylene vinyl acetate.

Ethylene vinyl acetate is a copolymer of ethylene and vinyl acetate. The weight percent of vinyl acetate in ethylene vinyl acetate typically varies from about 6 to about 40 percent vinyl acetate, where the weight percentage of ethylene in the polymer molecule exceeds that of the vinyl acetate. The vinyl acetate content and the molecular weight range influence hot melt rheology and particularly adhesive properties. The higher the ethylene content, the better the specific adhesion to non-polar substrates, such as polyolefins. The polymers higher in vinyl acetate show improved adhesion to polar substrates, such as paper. In embodiments herein, ethylene vinyl acetate having a higher level of vinyl acetate is selected. Lower molecular weight polymers yield lower-melt viscosity solid inks that are easier to process and apply.

Ethylene vinyl acetate as employed in the phase change ink compositions herein provides the softness and flexibility of elastomeric materials and the processing ability of thermoplastics. Further, ethylene vinyl acetate imparts good clarity, barrier properties, low-temperature toughness, stress-crack resistance, hot-melt adhesive, heat-sealing properties, and ultra-violet (UV) radiation resistance.

Ethylene vinyl acetate and hydrocarbon waxes are selected in embodiments herein to complement one another in use in the phase change ink compositions. Each of the ethylene vinyl acetate and hydrocarbon wax components has a certain set of properties that is selected to optimize the performance of the overall phase change ink composition. Hydrocarbon wax is relatively low priced, has low viscosity, good barrier properties to water vapor, and a very fast solidification time. Ethylene vinyl acetate has a high cohesive strength and good adhesion to paper, and enables the wax to maintain its water barrier properties.

Random ethylene vinyl acetate copolymers can have the following structure

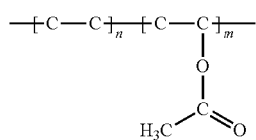

wherein n is an integer, and wherein, in embodiments, n is an integer from about 10 to about 220, and where m is an integer, and wherein, in embodiments, m is an integer from about 1 to about 40.

Examples of ethylene vinyl acetate include N8036, N8038F, N8038, N8045, MV1055, SV1055 and TV1055 available from Kamdar Plastics. Other examples of ethylene vinyl acetate available from Honeywell International Inc. include A-C® 400, A-C® 430, A-C® 405M, A-C® 405S, A-C® 405T, A-C® 415 and A-C® 430.

Still other examples of ethylene vinyl acetate are Nipoflex® 625, Nipoflex® 630, Nipoflex® 631, Nipoflex® 633, Nipoflex® 634, Nipoflex® Nipoflex® 680, Nipoflex® 681, Nipoflex® 710, Nipoflex® 720, Nipoflex® 722 and Nipoflex® 750 available from Tosoh Corporation.

The ethylene vinyl acetate can be present in the phase change ink composition herein at any suitable or desired amount. In embodiments, ethylene vinyl acetate is present in the phase change ink composition in an amount of from about 0.1 to about 10, or from about 0.5 to about 10, or from about 0.5 to about 5, or from about 1 to about 7, or from about 3 to about 5, or from about 4 to about 5 weight percent based on the total weight of the phase change ink composition. In certain embodiments, ethylene vinyl acetate is selected in an amount of from about 0.5 to about 5, or from about 1.5 to about 5, or less than about 5 percent by weight based on the total weight of the phase change ink composition.

In embodiments, ethylene vinyl acetates having different levels of vinyl acetate content were formulated in solid ink at loadings of from about 1.5 to about 5% by weight based on the total weight of the solid ink composition. The prepared inks were filtered and characterized by settling stability and rheology. All inks retained the expected dye-based and pigmented solid ink characteristics. The inks were successfully jetted and tested for scratch and fold.

In embodiments, ethylene vinyl acetate herein has a vinyl acetate content of from about 1 to about 40 percent, of from about 5 to about 30 percent, or from about 5 to about 16 percent, based on the total weight of the ethylene vinyl acetate.

In certain embodiments, the ethylene vinyl acetate is present in an amount of from about 0.5 to about 5 percent by weight, or from about 1.5 to about 5 percent by weight based on the total weight of the phase change ink composition and the ethylene vinyl acetate has a vinyl acetate content of about from about 5 to about 13 percent vinyl acetate based on the total weight of the ethylene vinyl acetate.

In other embodiments, the ethylene vinyl acetate is present in the phase change ink composition in an amount of about 0.5 percent by weight, based on the total weight of the phase change ink composition, and the ethylene vinyl acetate has a vinyl acetate content of about 25 to about 30 percent vinyl acetate based on the total weight of the ethylene vinyl acetate.

In embodiments, the ethylene vinyl acetate is selected for specific properties that enable the ethylene vinyl acetate materials to work as a component in the phase change ink. In certain embodiments, the ethylene vinyl acetate herein is selected to have a certain molecular weight average, a certain melting point, a certain freezing point, and a certain viscosity which enable or enhance performance in the phase change ink, such as good phase change performance.

In embodiments, the ethylene vinyl acetate selected for the phase change ink herein has a molecular weight average of from about 30,000 to about 150,000, or from about 40,000 to about 120,000, or from about 50,000 to about 100,000 Daltons.

In embodiments, the ethylene vinyl acetate selected for the phase change ink herein has a melting point of from about 45 to about 120, or from about 55 to about 110, or from about 80 to about 100° C.

In embodiments, the ethylene vinyl acetate selected for the phase change ink herein has a freezing point of from about 25 to about 100, or from about 35 to about 90, or from about 60 to about 80° C.

In embodiments, the ethylene vinyl acetate selected for the phase change ink herein has a viscosity of from about 150 to about 2,000, or from about 300 to about 15,000, or from about 400 to about 1,000 cps at 140° C.

Selected properties, provided by Honeywell International Inc., of selected ethylene vinyl acetate copolymers are provided in Table 1.

TABLE 1

| Copolymers/ Ethylene-Vinyl Acetate | Hardness (ASTM D-5) | Density g/cc (ASTM D-1505) | Viscosity @ 140° C. cps | Product Form | Vinyl Acetate % |
|---|---|---|---|---|---|
| A-C ® 400A | 9.5 | 0.92 | 595 | Powder | 12-16 |
| A-C ® 400M | 4-8 | 0.92 | 600 | Prill | 7.5-9.4 |
| A-C ® 405T | 3-7 | 0.92 | 600 | Prill | 5-7.4 |

In embodiments, an ink herein is prepared having a viscosity of about 10 to about 16 centipoise at 110° C.

The phase change ink compositions herein can include any suitable ink vehicle or carrier such as paraffins, microcrystalline waxes, polyethylene waxes, ester waxes, amides, fatty acids and other waxy materials, fatty amide containing materials, sulfonamide materials, resinous materials made from different natural sources (tall oil rosins and rosin esters, for example), and many synthetic resins, oligomers, polymers, and copolymers.

In embodiments, the phase change ink compositions herein include a phase change ink vehicle or carrier, in embodiments, a wax, in embodiments a polyalkylene wax. In further embodiments, the wax is a polymethylene wax, a polyethylene wax, or a mixture of combination thereof.

In certain embodiments, the phase change ink compositions herein include a biodegradable and compostable wax. In embodiments, the biodegradable and compostable wax is a biodegradable and compostable polyethylene wax such as Accumelt® 72, IGI 1266A, and the like, from International Group, Inc. Compostable wax as used herein is a compostable material based on ASTM D6400-04 (ASTM Publications), which is hereby incorporated by reference herein in its entirety, which recites a compostable plastic is a plastic that undergoes degradation by biological process during composting to yield carbon dioxide, water, inorganic compounds, and biomass at a rate consistent with other known compostable materials and leaves substantially no visually distinguishable or toxic residues.

In embodiments, the phase change ink compositions herein further comprises a low melting wax. In embodiments, the low melting wax is a polyalkylene wax, a functional wax, or a combination thereof. The term "functional wax" is known to one of skill in the art and can mean herein any suitable functional wax, in embodiments, including, but not limited to, a wax with polar groups, for example, alcohols, amides, esters, urethanes, etc. As used herein, the term "low melting wax" includes any suitable low melting wax, including, in embodiments, a wax having a melting point of less than about 120° C.

Examples of suitable amides include, for example, diamides, triamides, tetra-amides, cyclic amides and the like. Suitable triamides include, for example, those disclosed in U.S. Pat. No. 6,860,930, the entire disclosure of which is incorporated herein by reference. Suitable other amides, such as fatty amides including monoamides, tetra-amides, and mixtures thereof, are disclosed in, for example, U.S. Pat. Nos. 4,889,560, 4,889,761, 5,194,638, 4,830,671, 6,174,937, 5,372,852, 5,597,856, and 6,174,937, and British Patent No. GB 2 238 792, the entire disclosures of each are incorporated herein by reference.

The ink vehicle or carrier can be present in the phase change ink composition in any suitable or desired amount. In embodiments, the wax is present in the phase change ink composition in an amount of from about 25 percent to about 65 percent by weight based on the total weight of the phase change ink composition. In embodiments, the wax is a low melting wax present in the phase change ink composition in an amount of from about 25% to less than about 65% by weight based on the total weight of the ink carrier.

Other suitable carrier materials that can be used in the phase change ink composition include isocyanate-derived resins and waxes, such as urethane isocyanate-derived materials, urea isocyanate-derived materials, urethane/urea isocyanate-derived materials, mixtures thereof, and the like. Further information on isocyanate-derived carrier materials is disclosed in, for example, U.S. Pat. Nos. 5,750,604, 5,780, 528, 5,782,966, 5,783,658, 5,827,918, 5,830,942, 5,919,839, 6,255,432, and 6,309,453, British Patents Nos. GB 2 294 939, GB 2 305 928, GB 2 305 670, and GB 2 290 793, and PCT Publications WO 94/14902, WO 97/12003, WO 97/13816, WO 96/14364, WO 97/33943, and WO 95/04760, the entire disclosures of each of which are incorporated herein by reference.

In embodiments, the ink vehicle comprises a mixture of one or more amides and one or more isocyanate-derived materials.

Further examples of suitable ink vehicles include ethylene/propylene copolymers, such as those available from Baker Petrolite. Commercial examples of such copolymers include, for example, Petrolite CP-7 (Mn=650), Petrolite CP-11 (Mn=1,100, Petrolite CP-12 (Mn=1,200) and the like. The copolymers may have, for example, a melting point of from about 70° C. to about 150° C., such as from about 80° C. to about 130° C. or from about 90° C. to about 120° C. and a molecular weight range (Mn) of from about 500 to about 4,000.

Another type of ink vehicle may be n-paraffinic, branched paraffinic, and/or naphthenic hydrocarbons, typically with from about 5 to about 100, such as from about 20 to about 80 or from about 30 to about 60 carbon atoms, generally prepared by the refinement of naturally occurring hydrocarbons, such as BE SQUARE 185 and BE SQUARE 195, with molecular weights (Mn) of from about 100 to about 5,000, such as from about 250 to about 1,000 or from about 500 to about 800, for example such as available from Baker Petrolite.

Highly branched hydrocarbons, typically prepared by olefin polymerization, such as the VYBAR materials available from Baker Petrolite, including VYBAR 253 (Mn=520), VYBAR 5013 (Mn=420), and the like, may also be used. In addition, the ink vehicle may be an ethoxylated alcohol, such as available from Baker Petrolite and of the general formula

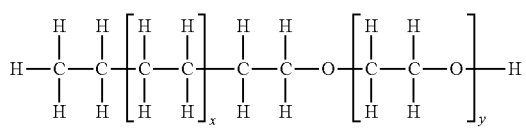

wherein x is an integer of from about 1 to about 50, such as from about 5 to about 40 or from about 11 to about 24 and y is an integer of from about 1 to about 70, such as from about 1 to about 50 or from about 1 to about 40. The materials may have a melting point of from about 60° C. to about 150° C., such as from about 70° C. to about 120° C. or from about 80° C. to about 110° C. and a molecular weight (Mn) range of from about 100 to about 5,000, such as from about 500 to about 3,000 or from about 500 to about 2,500. Commercial examples include UNITHOX 420 (Mn=560), UNITHOX 450 (Mn=900), UNITHOX 480 (Mn=2,250), UNITHOX 520 (Mn=700), UNITHOX 550 (Mn=1,100), UNITHOX 720 (Mn=875), UNITHOX 750 (Mn=1,400), and the like.

As an additional example, the ink vehicle may be made of fatty amides, such as monoamides, tetra-amides, mixtures thereof, and the like, for example such as described in U.S. Pat. No. 6,858,070, which is hereby incorporated herein by reference. In embodiments, the ink vehicle comprises a monoamide, a triamide, or a mixture thereof. Suitable monoamides may have a melting point of at least about 50° C., for example from about 50° C. to about 150° C., although the melting point can be outside these ranges. Specific examples of suitable monoamides include, for example, primary monoamides and secondary monoamides. Stearamide, such as KEMAMIDE® S available from Chemtura Corporation and CRODAMIDE® S available from Croda, behenamide/arachidamide, such as KEMAMIDE® B available from Chemtura Corporation and CRODAMIDE® BR available from Croda, oleamide, such as KEMAMIDE® U available from Chemtura Corporation and CRODAMIDE® OR available from Croda, technical grade oleamide, such as KEMAMIDE® 0 available from Chemtura Corporation, CRODAMIDE® 0 available from Croda, and UNISLIP® 1753 available from Uniqema, and erucamide such as KEMAMIDE® E available from Chemtura Corporation and CRODAMIDE® ER available from Croda, are some examples of suitable primary amides. Behenyl behenamide, such as KEMAMIDE® EX666 available from Chemtura Corporation, stearyl stearamide, such as KEMAMIDE® S-180 and KEMAMIDE® EX-672 available from Chemtura Corporation, stearyl erucamide, such as KEMAMIDE® E-180 available from Chemtura Corporation and CRODAMIDE® 212 available from Croda, erucyl erucamide, such as KEMAMIDE® E-221 available from Chemtura Corporation, oleyl palmitamide, such as KEMAMIDE® P-181 available from Chemtura Corporation and CRODAMIDE® 203 available from Croda, and erucyl stearamide, such as KEMAMIDE® S-221 available from Chemtura Corporation, are some examples of suitable secondary amides. Additional suitable amide materials include KEMAMIDE® W40 (N,N'-ethylenebisstearamide), KEMAMIDE® P181 (oleyl palmitamide), KEMAMID®E W45 (N,N'-ethylenebisstearamide), and KEMAMIDE® W20 (N,N'-ethylenebisoleamide).

High molecular weight linear alcohols, such as those available from Baker Petrolite and of the general formula

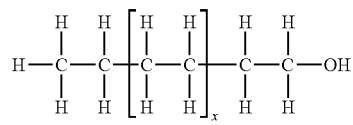

wherein x is an integer of from about 1 to about 50, such as from about 5 to about 35 or from about 11 to about 23, may also be used as the ink vehicle. These materials may have a melting point of from about 50° C. to about 150° C., such as from about 70° C. to about 120° C. or from about 75° C. to about 110° C., and a molecular weight (Mn) range of from about 100 to about 5,000, such as from about 200 to about 2,500 or from about 300 to about 1,500. Commercial examples include the UNILIN® materials such as UNILIN® 425 (Mn=460), UNILIN® 550 (Mn=550), UNILIN® 700 (Mn=700), and distilled alcohols, the viscosity of which at the jetting temperature in one embodiment can be from about 5 to about 50% higher than the non-distilled alcohol.

A still further example includes hydrocarbon-based waxes, such as the homopolymers of polyethylene available from Baker Petrolite and of the general formula

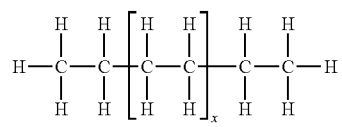

wherein x is an integer of from about 1 to about 200, such as from about 5 to about 150 or from about 12 to about 105. These materials may have a melting point of from about 60° C. to about 150° C., such as from about 70° C. to about 140° C. or from about 80° C. to about 130° C. and a molecular weight (Mn) of from about 100 to about 5,000, such as from about 200 to about 4,000 or from about 400 to about 3,000. Example waxes include PW400 (Mn about 400), distilled PW400, in one embodiment having a viscosity of about 10% to about 100% higher than the viscosity of the undistilled POLYWAX® 400 at about 110° C., POLYWAX 500 (Mn about 500), distilled POLYWAX® 500, in one embodiment having a viscosity of about 10% to about 100% higher than the viscosity of the undistilled POLYWAX® 500 at about 110° C., POLYWAX 655 (Mn about 655), distilled POLYWAX® 655, in one embodiment having a viscosity of about 10% to about 50% lower than the viscosity of the undistilled POLYWAX® 655 at about 110° C., and in yet another embodiment having a viscosity of about 10% to about 50% higher than the viscosity of the undistilled POLYWAX® 655 at about 110° C. POLYWAX 850 (Mn about 850), POLYWAX 1000 (Mn about 1,000), and the like.

Another example includes modified maleic anhydride hydrocarbon adducts of polyolefins prepared by graft copolymerization, such as those available from Baker Petrolite and of the general formulas

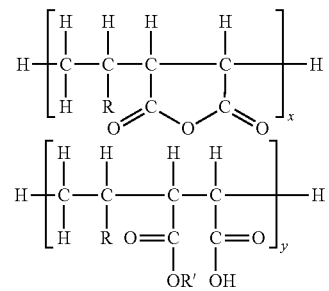

wherein R is an alkyl group with from about 1 to about 50, such as from about 5 to about 35 or from about 6 to about 28 carbon atoms, R' is an ethyl group, a propyl group, an isopropyl group, a butyl group, an isobutyl group, or an alkyl group with from about 5 to about 500, such as from about 10 to about 300 or from about 20 to about 200 carbon atoms, x is an integer of from about 9 to about 13, and y is an integer of from about 1 to about 50, such as from about 5 to about 25 or from about 9 to about 13, and having melting points of from about 50° C. to about 150° C., such as from about 60° C. to about 120° C. or from about 70° C. to about 100° C.; and those available from Baker Petrolite and of the general formula

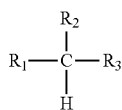

wherein $R_1$ and $R_3$ are hydrocarbon groups and $R_2$ is either of one of the general formulas

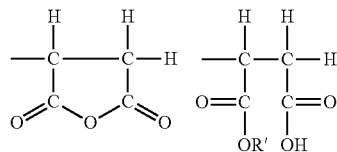

or a mixture thereof, wherein R' is an isopropyl group, which materials may have melting points of from about 70° C. to about 150° C., such as from about 80° C. to about 130° C. or from about 90° C. to about 125° C., with examples of modified maleic anhydride copolymers including CER-AMER 67 (Mn=655, Mw/Mn=1.1), CERAMER 1608 (Mn=700, Mw/Mn=1.7), and the like.

Additional examples of suitable ink vehicles for the phase change inks include rosin esters; polyamides; dimer acid amides; fatty acid amides, including ARAMID C; epoxy resins, such as EPOTUF 37001, available from Riechold Chemical Company; fluid paraffin waxes; fluid microcrystalline waxes; Fischer-Tropsch waxes; polyvinyl alcohol resins; polyols; cellulose esters; cellulose ethers; polyvinyl pyridine resins; fatty acids; fatty acid esters; poly sulfonamides, including KETJENFLEX MH and KETJENFLEX MS80; benzoate esters, such as BENZOFLEX S552, available from Velsicol Chemical Company; phthalate plasticizers; citrate plasticizers; maleate plasticizers; sulfones, such as diphenyl sulfone, n-decyl sulfone, n-arnyl sulfone, chlorophenyl methyl sulfone; polyvinyl pyrrolidinone copolymers; polyvinyl pyrrolidone/polyvinyl acetate copolymers; novolac resins, such as DUREZ 12 686, available from Occidental Chemical Company; and natural product waxes, such as beeswax, monton wax, candelilla wax, GILSONITE (American Gilsonite Company), and the like; mixtures of linear primary alcohols with linear long chain amides or fatty acid amides, such as those with from about 6 to about 24 carbon atoms, including PARICIN 9 (propylene glycol monohydroxystearate), PARICIN 13 (glycerol monohydroxystearate), PARICIN 15 (ethylene glycol monohydroxystearate), PARICIN 220 (N(2-hydroxyethyl)-12-hydroxystearamide), PARICIN 285 (N,N'-ethylene-bis-12-hydroxystearamide), FLEXRICIN 185 (N,N'-ethylene-bis-ricinoleamide), and the like. Further, linear long chain sulfones with from about 4 to about 16 carbon atoms, such as n-propyl sulfone, n-pentyl sulfone, n-hexyl sulfone, n-heptyl sulfone, n-octyl sulfone, n-nonyl sulfone, n-decyl sulfone, n-undecyl sulfone, n-dodecyl sulfone, n-tridecyl sulfone, n-tetradecyl sulfone, n-pentadecyl sulfone, n-hexadecyl sulfone, and the like, are suitable ink vehicle materials.

In embodiments, the ink vehicle comprises (a) stearyl stearamide, (b) a triamide, or (c) mixtures thereof.

In addition, the ink vehicles described in U.S. Pat. No. 6,906,118, which is incorporated herein by reference, may also be used. The ink vehicle may contain a branched triamide such as those described in U.S. Pat. No. 6,860,930, the disclosure of which is also incorporated by reference herein,

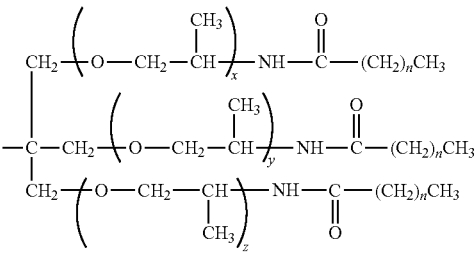

wherein n has an average value of from about 34 equal to or less than 40, where x, y and z can each be zero or an integer, and wherein the sum of x, y, and z is from about 5 and equal to or less than 6.

Optionally, a plasticizer, which can be either a solid or liquid plasticizer, such as benzyl phthalates, triaryl phosphate esters, pentaerythritol tetrabenzoate, dialkyl adipate, dialkyl phthalates, dialkyl sebacate, alkyl benzyl phthalates, ethylene glycol monostearate, glycerol monostearate, propylene glycol monostearate, dicyclohexyl phthalate, diphenyl isophthalate, triphenyl phosphate, dimethyl isophthalate, and mixtures thereof, or the like can also be included in the ink carrier. The plasticizer is present in the ink carrier in any desired or effective amount, such as from about 0.05% by weight of the ink carrier. Examples of suitable plasticizers include SANTICIZER® 278, SANTICIZER® 154, SANTICIZER®160, SANTICIZER® 261 (commercially available from Monsanto), and the like or mixtures thereof.

An antioxidant such as a hindered amine antioxidant can optionally be present in the ink in any desired or effective amount, such as from about 0.001 percent to about 0.50 percent by weight of the total ink composition.

Examples of suitable hindered amine antioxidants include those of general formula

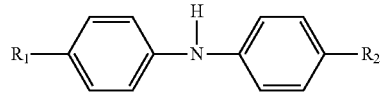

wherein $R_1$ and $R_2$ each, independently of the other, can be a hydrogen atom or an alkyl group, including linear, branched, saturated, unsaturated, cyclic, substituted, and unsubstituted alkyl groups, and wherein hetero atoms, such as oxygen, nitrogen, sulfur, silicon, phosphorus, boron, either may or may not be present in the alkyl group, in one embodiment with at least 1 carbon atom, if substituted, substitutions can be alkyl or phenyl.

Specific examples of suitable hindered amine antioxidants include the following antioxidants commercially available from Crompton; NAUGUARD® 445 where $R_1=R_2=C(CH_3)_2Ph$, NAUGUARD® 635 where $R_1=R_2=-CH(CH_3)Ph$, NAUGUARD® PS-30 where $R_1=C_4$ or $C_8$, $R_2=C_4$ or $C_8$ and the like.

A hindered phenol antioxidant can also be provided. In one embodiment the hindered phenol is present in a relatively high concentration. A high concentration of hindered phenol antioxidant maximizes long term thermal stability by delaying the onset of the oxidation itself. The hindered phenol antioxidant is present in the ink in any desired or effective amount, in embodiments from about 0.01% to about 4.0% by weight of the total ink composition. Specific examples of suitable hindered phenol antioxidants include ETHANOX® 330, ETHANOX® 310, ETHANOX® 314, ETHANOX® 376 (commercially available from Albemarle) and the like. Also commercially available from Ciba Specialty Chemicals are IRGANOX® 1010, IRGANOX® 1035, IRGANOX®1076, IRGANOX® 1330 and the like. Mixtures of two or more of these hindered phenol antioxidants can also be employed.

A rosin ester resin, mixtures thereof, or the like can also be included in the phase change ink composition. The rosin ester resin is present in any desired or effective amount, in embodiments from 0.5% to about 20% by weight of the total ink composition. Examples of suitable rosin ester resins include Pinecrystal KE-100 (commercially available from Arakawa Chemical Industries), and the like.

The phase change ink composition can include ink carrier comprising wax and other optional carrier components in any desired or effective amount, in one embodiment in an amount of at least about 50% by weight of the ink, in another embodiment of at least about 70% by weight of the ink, and in yet another embodiment of at least about 90% by weight of the ink, and in one embodiment equal to or less than about 99% by weight of the ink, in another embodiment equal to or less than about 98% by weight of the ink, and in yet another embodiment equal to or less than about 95% by weight of the ink, although the amount can be outside of these ranges. In certain embodiments, in an amount of from about 25% to about 65% by total weight of the phase change ink composition.

In one specific embodiment, the ink carrier has a melting point of less than about 110° C., and in another embodiment of less than about 100° C., although the melting point of the ink carrier can be outside of these ranges.

The phase change ink compositions also contain an optional colorant. The colorant can be any suitable or desired colorant including dyes, pigments, and mixtures and combinations thereof. In specific embodiments, the colorant is a pigment. In other embodiments, the colorant is a dye. In certain embodiments, the colorant is a cyan pigment. In certain other embodiments, the colorant is a cyan dye.

The colorant is present in the phase change ink in any desired or effective amount to obtain the desired color or hue, in embodiments from about 0.1 to about 15 percent by weight based on the total weight of the phase change ink composition.

The phase change ink compositions disclosed herein in one embodiment have melting points in one embodiment equal to or less than about 130° C., in another embodiment equal to or less than about 120° C., in a further embodiment equal to or less than about 110° C., and in still another embodiment equal to or less than about 100° C., although the melting point can be outside of these ranges.

The phase change ink compositions herein generally have melt viscosities, at the jetting temperature which can be equal to or less than about 145° C., in one embodiment equal to or less than about 130° C., and in another embodiment equal to or less than about 120° C., in a further embodiment equal to or less than about 110° C., and in yet another embodiment equal to or less than about 80° C., although the jetting temperature can be outside of these ranges, which are in one embodiment equal to or less than about 30 centipoise (cps), in another embodiment equal to or less than about 25 cps, and in yet a further embodiment equal to or less than about 20 cps, and in another embodiment no less than about 2 cps, in a further embodiment no less than about 3 cps, and in yet a further embodiment no less than about 4 cps, although the melt viscosity can be outside of these ranges.

In certain embodiments, the phase change ink composition herein has a jetting temperature of from about 100° C. to about 130° C.

In embodiments, the phase change ink composition herein has a viscosity of about 10 to about 16 centipoise at 110° C.

The phase ink compositions of the present disclosure can be prepared by any desired or suitable method. In embodiments, a method for preparing a phase change ink composition comprises combining a wax; an optional colorant; and ethylene vinyl acetate to produce a phase change ink composition. For example, the ink ingredients can be mixed together, followed by heating, to a temperature of at least about 100° C. to no more than about 140° C., although the temperature can be outside of this range, and stirring until a homogeneous ink composition is obtained, followed by cooling the ink to ambient temperature (typically from about 20 to about 25° C.). The inks of the present disclosure are solid at ambient temperature. In a specific embodiment, during the formation process, the inks in their molten state are poured into molds and then allowed to cool and solidify to form ink sticks.

The inks disclosed herein can be employed in apparatus for direct printing ink jet processes and in indirect (offset) printing ink jet applications. Another embodiment is directed to a process which comprises incorporating an ink as disclosed herein into an ink jet printing apparatus, melting the ink, and causing droplets of the melted ink to be ejected in an imagewise pattern onto a recording substrate. A direct printing process is also disclosed in, for example, U.S. Pat. No. 5,195,430, the disclosure of which is totally incorporated herein by reference. The inks prepared as disclosed herein can be employed in apparatus for indirect (offset) printing ink jet applications. Another embodiment is directed to a process which comprises incorporating an ink prepared as disclosed herein into an ink jet printing apparatus, melting the ink, causing droplets of the melted ink to be ejected in an imagewise pattern onto an intermediate transfer member, and transferring the ink in the imagewise pattern from the intermediate transfer member to a final recording substrate. In a specific embodiment, the intermediate transfer member is heated to a temperature above that of the final recording sheet and below that of the melted ink in the printing apparatus. An offset or indirect printing process is also disclosed in, for example, U.S. Pat. No. 5,389,958, the disclosure of which is totally incorporated herein by reference. In one specific embodiment, the printing apparatus employs a piezoelectric printing process wherein droplets of the ink are caused to be ejected in imagewise pattern by oscillations of piezoelectric vibrating elements.

Any suitable substrate or recording sheet can be employed, including plain papers such as XEROX® 4024 papers, XEROX® Image Series papers, Courtland 4024 DP paper, ruled notebook paper, bond paper, silica coated papers such as Sharp Company silica coated paper, JuJo paper, Hammermill Laserprint Paper, and the like, transparency materials, fabrics, textile products, plastics, polymeric films, inorganic substrates such as metals and wood, and the like.

EXAMPLES

The following Examples are being submitted to further define various species of the present disclosure. These Examples are intended to be illustrative only and are not intended to limit the scope of the present disclosure. Also, parts and percentages are by weight unless otherwise indicated.

Ethylene vinyl acetate copolymers with different levels of vinyl acetate were obtained from Honeywell International Inc. The dispersant used was prepared as described in Example 1 of U.S. Pat. No. 7,973,186, which is hereby incorporated by reference herein in its entirety. The components of the solid ink are presented in Table 2 below:

TABLE 2

| Ink Base Component | Details |
|---|---|
| Accumelt ® R3910 | A fractionated polymethylene wax available from The International Group, Inc. |
| Triamide wax | Triamide wax Xerox U.S. Pat. No. 6,860,930 |
| KEMAMIDE ® S-180 | Stearyl stearamide |
| KE-100 | triglycerides of hydrogenated abietic acid |
| Urethane resin | urethane resin, Xerox U.S. Pat. No. 6,309,453 |
| Naugard ® 445 | Antioxidant |

Triamide wax as prepared in Example 1 of U.S. Pat. No. 6,860,930, which is hereby incorporated by reference herein in its entirety.

KEMAMIDE® S-180, stearyl stearamide available from Chemtura Corporation.

KE-100, triglycerides of hydrogenated abietic acid, available from Arakawa Chemical Industries.

Urethane resin as prepared in Example 4 of U.S. Pat. No. 6,309,453, which is hereby incorporated by reference herein in its entirety.

Naugard® 445, aromatic amine antioxidant available from Chemtura Corporation.

Cyan dye as prepared in Example VII of U.S. Pat. No. 6,476,219, which is hereby incorporated by reference herein in its entirety, was prepared as follows.

A mixture of 4-(3-pentadecyl) phenoxyphthalonitrile (25.8 grams, 0.060 mole), copper(II) acetate dehydrate (3.0 grams, 0.015 mole), and ammonium acetate (9.2 grams, 0.12 mole) in 100 milliliters of NMP was stirred and heated to 120° C. Slow gas evolution was observed, and after 5 minutes a deep, dark blue color developed. After 30 minutes as 120° C. the reaction mixture was heated to 180° C. for 1 hour. NMP (50 milliliters) was then added and the mixture was stirred and reheated to 180° C., followed by cooling with stiffing to room temperature. The product was then filtered and the solid was washed in the filter funnel with 2×100 milliliter portion of DMF. It was then stiffed in 200 milliliters of acetone at 50° C. and subsequently filtered. This acetone treatment was repeated, and the solid was dried at 60° C. overnight to give the product as a coarse powder (19.9 grams, 74 percent). The spectral strength of this material was $1.27 \times 10^5$ A*ml/g, which is indicative of high (i.e. about 98 percent) purity.

Comparative Example 1

Standard Cyan Pigmented Solid Ink Formulation

Preparation of pigment concentrate. Cyan concentrates containing 15 weight percent pigment, 12 weight percent dispersant prepared as described in Example 1 of U.S. Pat. No. 7,973,186, 3.75 weight percent Sunflo® SFD-B 124 (a derivatized sulfonated copper phthalocyanine, available from Sun Chemical) as synergist, and 69.25 weight percent KEMAMIDE® S-180 were processed in a Hockmeyer Equipment corporation mixer for 4 hours.

Preparation of solid ink containing pigment concentrate. A 12 gram sample of the concentrate obtained from the Hockmeyer mixer was placed into a pre-heated vessel with pre-heated stiffer bar and allowed to stir for 10 minutes. To this were slowly added, having already been melted and thoroughly mixed at 120° C., 52.34 parts (52.34 grams) Accumelt® R3910, 12.52 parts (12.52 grams) triamide wax, 12.52 parts (12.52 grams) KE-100 resin, 1.18 parts (1.18 grams) urethane resin, 9.13 parts (9.13 grams) KEMAMIDE® S-180, and 0.31 parts (0.31 grams) Naugard® 445. The resultant ink was stirred for 2 hours at 120° C. The resultant ink was filtered through a 5 μm stainless steel mesh.

Example 2

Pigmented Cyan Ink. A pigmented cyan ink was prepared having the concentrate and ink formulation in Comparative Example 1 but with the addition of 3.0 weight percent ethylene vinyl acetate containing 13 weight percent vinyl acetate (A-C 400A) added to the ink with stiffing to the molten ink. The resultant mixture was filtered through a 5 μm stainless steel mesh.

Example 3

Pigmented Cyan Ink. A pigmented cyan ink was prepared having the concentrate and ink formulation in Comparative Example 1 but with the addition of 3.0 weight percent ethylene vinyl acetate containing 6 weight percent vinyl acetate (A-C® 405T) added to the ink with stiffing to the molten ink. The resultant mixture was filtered through a 5 μm stainless steel mesh.

Example 4

Pigmented Cyan Ink. A pigmented cyan ink was prepared having the concentrate and ink formulation in Comparative Example 1 but with the addition of 4.5 weight percent A-C® 400A added to the ink with stirring to the molten ink. The resultant mixture was filtered through a 5 μm stainless steel mesh.

Example 5

Pigmented Cyan Ink. A pigmented cyan ink was prepared having the concentrate and ink formulation in Comparative Example 1 but with the addition of 4.5 weight percent A-C® 405T added to the ink with stirring to the molten ink. The resultant mixture was filtered through a 5 μm stainless steel mesh.

Example 6

The concentrate formulation of Example 1 was prepared. 12 grams of the concentrate of Comparative Example 1 was placed into a pre-heated vessel with pre-heated stirrer bar and allowed to stir for 10 minutes. To this were slowly added, having already been melted and thoroughly mixed at 120° C., 51.84 parts Accumelt® R3910, 12.52 parts (12.52 grams) triamide wax, 10.52 parts (10.52 grams) KE-100 resin, 1.18 parts (1.18 grams) urethane resin, 6.63 parts (6.63 grams) KEMAMIDE® S180, 0.31 parts (0.31 grams) Naugard® 445, and 5.0 parts (5.0 percent) A-C® 400A. The resultant ink was stirred for 2 hours at 120° C. and then filtered through a 5 μm stainless steel mesh.

Comparative Example 7

Dye-based Cyan Ink. A molten and thoroughly mixed blend consisting of 52.44 (52.44 grams) parts Accumelt® R3910, 13.32 parts (13.32 grams) triamide wax (triamide wax described in Example 1 of U.S. Pat. No. 6,860,930), 13.32 parts KE-100 resin, 14.89 parts (14.89 grams) KEMAMIDE® S180, 2.31 parts (2.31 grams) urethane resin, and 0.21 parts (0.21 grams) Naugard® 445 were placed into a 600 milliliter beaker on top of a hot plate and allowed to stir for 1 hour at 105° C. To this were slowly added, 3.51 parts (3.51 grams) Blue Dye prepared as described in Example VII of U.S. Pat. No. 6,476,219. The resultant ink was stirred for 2.5 hours at 120° C. and then was filtered through a 5 µm stainless steel mesh and 1 µm paper filter, respectively.

Example 8

Dye-based Cyan Ink. A dye-based cyan ink was prepared having the concentrate and ink formulation in Comparative Example 7 but with the addition of 1.5 percent of A-C® 400A added to the ink with stirring to the molten ink. The resultant mixture was filtered through a 5 µm stainless steel mesh.

Example 9

Dye-based Cyan Ink. A dye-based cyan ink was prepared having the concentrate and ink formulation in Comparative Example 7 but with the addition of 5 percent of A-C® 405T added to the ink with stirring to the molten ink. The resultant mixture was filtered through a 5 µm stainless steel mesh.

The rheological properties of the inks were determined at 110° C. using a 50 millimeter cone and plate geometry on a RFS-III rheometer, obtained from Rheometrics Corporation, now TA Instruments, Inc. The shear rate viscosities at two different shear rates (from a shear rate sweep of 1 to approximately 251.2 $(s^{-1})$) were compared. Newtonian behavior is realized when the difference of the viscosities at each of these comparative shear rates, such as 1 and 100 $s^{-1}$ are minimized, such as being less than 1 cP, such as being less than 0.5 cP or zero. The rheology results indicated that the inks of the present disclosure, which incorporated ethylene vinyl acetate with different levels of vinyl acetate, displayed Newtonian behavior as can be seen in Table 3.

TABLE 3

| Ink # | EVA wax | EVA in ink (percent by weight) | Viscosity @ 1 $s^{-1}$ (cP) | Viscosity @ 100 $s^{-1}$ (cP) |
|---|---|---|---|---|
| Example 2 | A-C ® 400A | 3 | 14.33 | 14.09 |
| Example 3 | A-C ® 405T | 3 | 14.17 | 14.07 |
| Example 4 | A-C ® 400A | 4.5 | 16.46 | 16.26 |
| Example 5 | A-C ® 405T | 4.5 | 16.03 | 15.67 |
| Example 6 | A-C ® 400A | 5 | 15.83 | 15.55 |
| Example 9 | A-C ® 405T | 5 | 11.94 | 11.95 |

All of the inks were filterable and had good Newtonian quality. All of the inks were jetted using a Xerox® Phaser® 8860 printer, and displayed excellent jetting characteristics. The inks did not show any settling after standing undisturbed in an oven at 120° C. for a period of 1 week.

Image Characterization and Analysis.

Ink Printing.

Printed images tested for robustness using the standard 3 finger solid ink gouge tester and the Duplo paper folder performing a trifold. Printed image was standard IQAF tape-fold-scratch print done at a 525×450 dpi resolution.

Procedure.

The scratch/gouge fixture is used to evaluate print robustness to scratch and gouge using the automated Image Quality Analysis Facility (IQAF). Heavy, Medium and Light scratch fingers with specific weights are applied to the page with a controlled normal force and the print platen is moved underneath at a constant rate of motion. The prints are evaluated by IQAF for the visibility of the scratch and amount of material removed.

The scratched print is then fed through a Duplo D-590 folder to perform a trifold. The crease area is straightened out over a 90 degree edge and brushed to remove loose material. The fold crease area is evaluated using the image quality analysis facility (IQAF).

Results.

Figure 2:
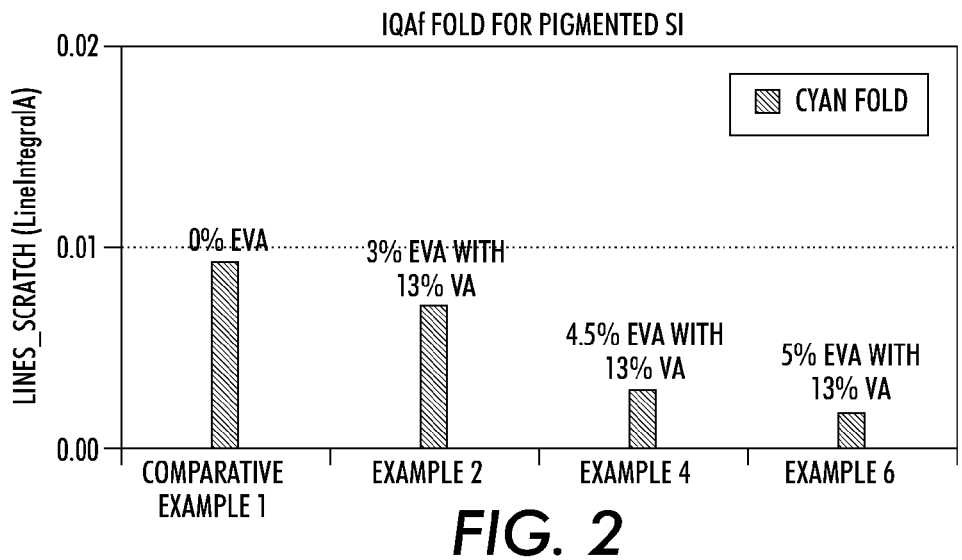
FIG. 2 is a bar graph showing IQAF fold for a comparative pigmented cyan phase change ink and for pigmented cyan phase change ink in accordance with the present disclosure and for pigmented cyan phase change ink in accordance with the present disclosure.

In FIG. 1 and FIG. 2, the fold and scratch results are compared between pigmented cyan solid ink containing no ethylene vinyl acetate and pigmented cyan solid ink with incorporation of respectively 3%, 4.5%, and 5% ethylene vinyl acetate containing 13% vinyl acetate (Examples 2, 4, and 6). The results indicate that the addition of 3 to 5% by weight ethylene vinyl acetate (containing about 13% by weight vinyl acetate) improves the performance of the pigmented solid ink with respect to heavy scratch and especially medium scratch. Further, ethylene vinyl acetate incorporation into pigmented solid in has a positive influence on the ink image robustness with respect to fold. For example, pigmented cyan ink print scratches almost 4 times less by incorporation of 5% by weight modified ethylene vinyl acetate containing about 13% by weight vinyl acetate.

Figure 3:
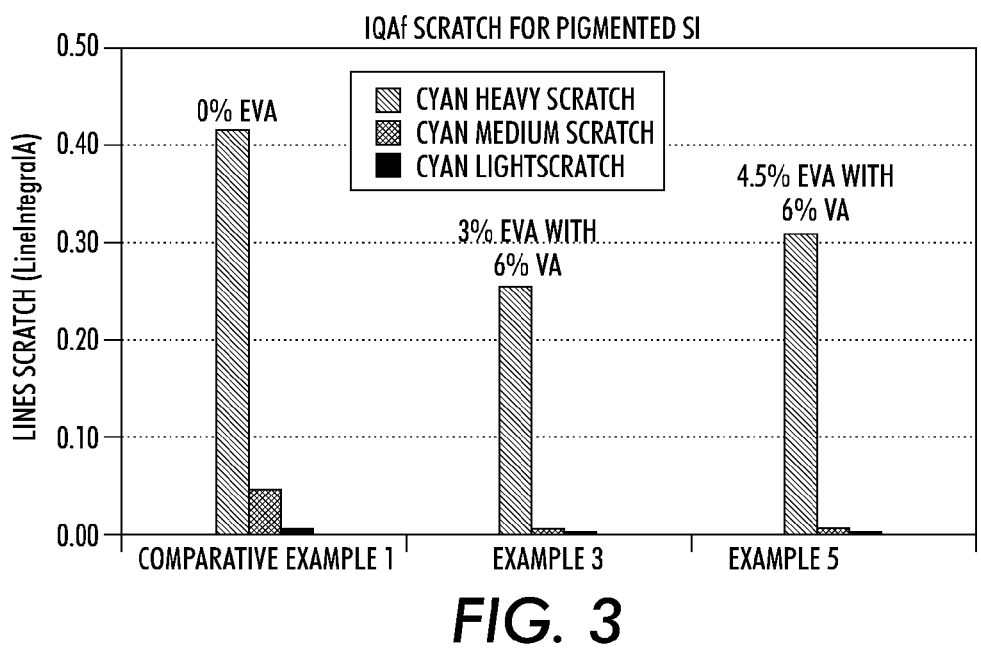
FIG. 3 is a bar graph showing IQAF scratch for comparative pigmented cyan phase change ink and for pigmented cyan phase change ink in accordance with the present disclosure.
Figure 4:
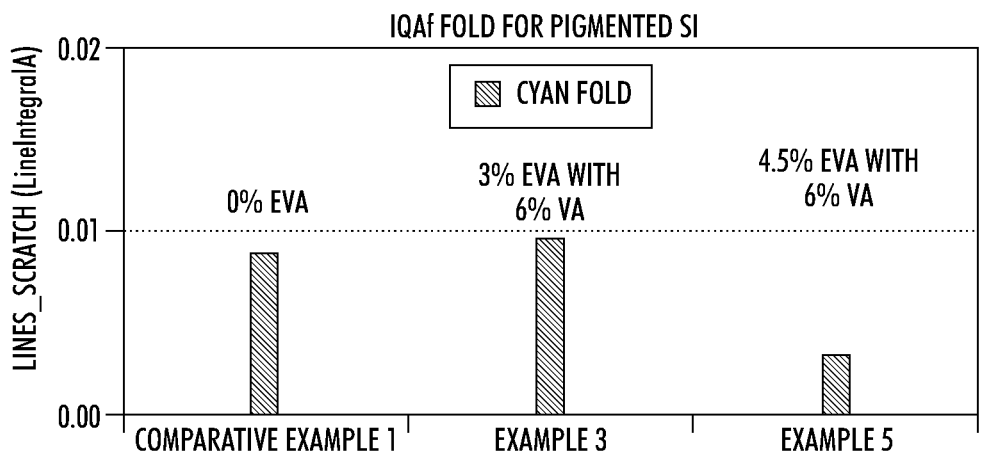
FIG. 4 is a bar graph showing IQAF fold for comparative pigmented cyan phase change ink and for pigmented cyan phase change ink in accordance with the present disclosure.

Addition of ethylene vinyl acetate containing about 13% vinyl acetate by weight to pigmented solid ink significantly improves the performance of the ink with respect to scratch and fold. Incorporation of ethylene vinyl acetate with 6% vinyl acetate by weight into pigmented solid ink provides only a minimal improvement to the scratch and fold properties of the ink, especially if the ethylene vinyl acetate wax is present in the ink at levels greater than 3 percent by weight. FIG. 3 and FIG. 4 illustrate scratch and fold results for ink Examples 1, 3 and 5.

Figure 5:
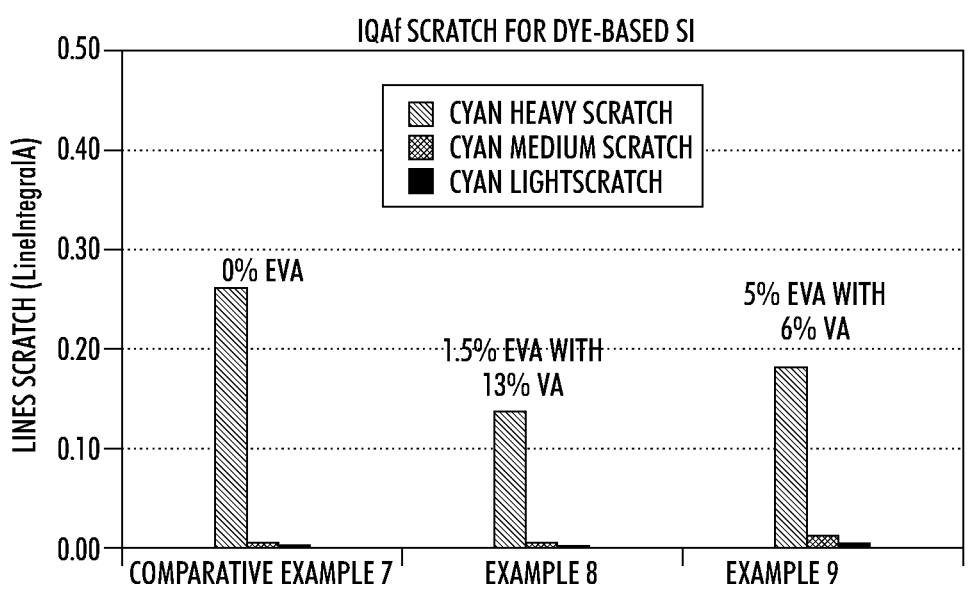
FIG. 5 is a bar graph showing IQAF scratch for a comparative dye-based cyan phase change ink and for dye-based cyan phase change ink in accordance with the present disclosure.
Figure 6:
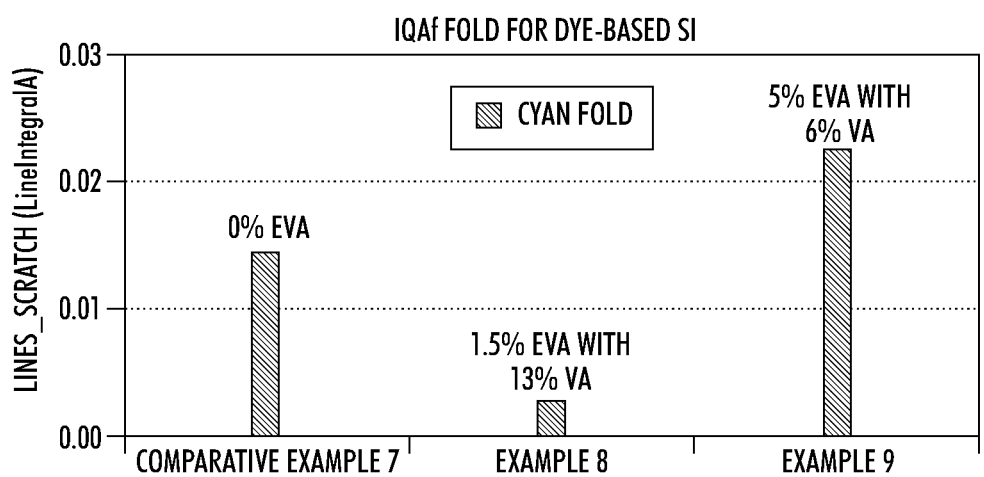
FIG. 6 is a bar graph showing IQAF fold for a comparative dye-based cyan phase change ink and for dye-based cyan phase change ink in accordance with the present disclosure.

Incorporation of ethylene vinyl acetate to dye-based solid ink resulted in similar behavior as with the addition of ethylene vinyl acetate with different levels of vinyl acetate into pigmented solid ink. Results show that the addition of 1.5% ethylene vinyl acetate by weight containing about 13% vinyl acetate by weight to pigmented solid ink significantly improves the performance of the ink with respect to scratch and fold, while the addition of 5% ethylene vinyl acetate by weight containing 6% vinyl acetate by weight does not provide the same improvement to image robustness. FIG. 5 and FIG. 6 illustrate scratch and fold results for Comparative Example 7 and dye-based ink Examples 8 and 9.

In embodiments, addition of up to about 5 percent ethylene vinyl acetate by weight containing high levels of vinyl acetate to pigmented and dye-based solid ink significantly improves the performance of the ink with respect to scratch and fold resistance while preserving the needed characteristics of current pigmented solid inks including Newtonian rheology, good filtration properties, thermal stability, ink jetting robustness, and ink image transfix robustness.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims. Unless specifically recited in a claim, steps or components of claims should not be implied or imported from the specification or any other claims as to any particular order, number, position, size, shape, angle, color, or material.

The invention claimed is:

1. A phase change ink composition comprising:
an ink vehicle;
an optional colorant; and
ethylene vinyl acetate in an amount of from about 0.1 to about 10 percent by weight based on the total weight of the phase change ink composition;
wherein the ethylene vinyl acetate has a vinyl acetate content of from about 1 percent to about 40 percent by weight based on the total weight of the ethylene vinyl acetate.

2. The phase change ink composition of claim 1, wherein the ethylene vinyl acetate is present in an amount of from about 0.5 percent to about 5 percent by weight based on the total weight of the phase change ink composition.

3. The phase change ink composition of claim 1, wherein the ethylene vinyl acetate is present in an amount of from about 1.5 percent to about 5 percent by weight based on the total weight of the phase change ink composition.

4. The phase change ink composition of claim 1, wherein the ethylene vinyl acetate is present in an amount of from about 3 percent to about 5 percent by weight based on the total weight of the phase change ink composition.

5. The phase change ink composition of claim 1, wherein the ethylene vinyl acetate has a molecular weight average of from about 30,000 to about 150,000 Daltons.

6. The phase change ink composition of claim 1, wherein the ethylene vinyl acetate has a melting point of from about 45 to about 120° C.

7. The phase change ink composition of claim 1, wherein the ethylene vinyl acetate has a freezing point of from about 25 to about 100° C.

8. The phase change ink composition of claim 1, wherein the ethylene vinyl acetate has a viscosity of from about 150 to about 2,000 cps.

9. The phase change ink composition of claim 1, wherein the ethylene vinyl acetate is present in an amount of about 0.5 percent to about 5 percent and wherein the ethylene vinyl acetate has a vinyl acetate content of 5 to about 13 percent by weight based on the total weight of the ethylene vinyl acetate.

10. The phase change ink composition of claim 1, wherein the ethylene vinyl acetate is present in an amount of about 5 percent by weight based on the total weight of the phase change ink composition; and wherein the ethylene vinyl acetate has a vinyl acetate content of about 25 to about 30 percent vinyl acetate based on the total weight of the ethylene vinyl acetate.

11. The phase change ink composition of claim 1, wherein the colorant is a dye; or
wherein the colorant is a pigment.

12. The phase change ink composition of claim 1, wherein the ink vehicle comprises a wax.

13. The phase change ink composition of claim 1, wherein the ink vehicle comprises a polymethylene wax, a polyethylene wax, a biodegradable and compostable wax, a biodegradable and compostable polyethylene wax, or a mixture or combination thereof.

14. The phase change ink composition of claim 1, wherein the ink vehicle is present in the phase change ink composition in an amount of from about 25 percent to about 65 percent by weight based on the total weight of the phase change ink composition.

15. The phase change ink composition of claim 1, wherein the ink vehicle comprises a monoamide, a triamide, or a mixture thereof.

16. The phase change ink composition of claim 1, wherein the ink vehicle comprises (a) stearyl stearamide, (b) a triamide, or (c) mixtures thereof.

17. The phase change ink composition of claim 1, wherein the ink vehicle comprises an isocyanate-derived material, a urethane isocyanate-derived material, a urea isocyanate-derived material, a urethane/urea isocyanate-derived material, or mixtures thereof; or
wherein the ink vehicle comprises a mixture of one or more amides and one or more isocyanate-derived materials.

18. A method comprising:
incorporating into an ink jet printing apparatus a phase change ink composition comprising an ink vehicle; an optional colorant; and ethylene vinyl acetate in an amount of from about 0.1 to about 10 percent by weight based on the total weight of the phase change ink composition, wherein the ethylene vinyl acetate has a vinyl acetate content of from about 1 percent to about 40 percent by weight based on the total weight of the ethylene vinyl acetate;
melting the ink composition; and
causing droplets of the melted ink to be ejected in an imagewise pattern onto a substrate.

19. An ink jet printer stick or pellet containing a phase change ink composition comprising:
an ink vehicle;
an optional colorant; and
ethylene vinyl acetate in an amount of from about 0.1 to about 10 percent by weight based on the total weight of the phase change ink composition, wherein the ethylene vinyl acetate has a vinyl acetate content of from about 1 percent to about 40 percent by weight based on the total weight of the ethylene vinyl acetate.

* * * * *